United States Patent
Okino

[15] 3,683,403
[45] Aug. 8, 1972

[54] SOUNDING DEVICE FOR MEASURING A DISTANCE TO OBJECTS

[72] Inventor: Mutsuo Okino, Tokyo, Japan

[73] Assignee: Japan Radio Company, Limited, Tokyo, Japan

[22] Filed: Nov. 9, 1970

[21] Appl. No.: 87,770

[30] Foreign Application Priority Data
Nov. 8, 1969 Japan ..................... 44/89660

[52] U.S. Cl. ............ 346/33 EC, 340/3 R, 346/139 A
[51] Int. Cl. .............................................. G01s 7/60
[58] Field of Search .......... 346/33 EC, 35, 139 A, 65; 340/3 F, 1 C; 343/5 PC; 235/92 SH

[56] References Cited
UNITED STATES PATENTS
3,363,226  1/1968  Murphree .................. 340/3 F

*Primary Examiner*—Joseph W. Hartary
*Attorney*—Flynn & Frishauf

[57] ABSTRACT

A sounding device for measuring distance to an object wherein the transmitted and received reflected sound waves are converted to digital signals which are stored in a memory device at a variable rate. The storage rate of information in the memory device is set in accordance with the range of the distances being measured. The stored information is read out of the memory device at a fixed repetition rate and is fed to a display means which indicates the distance to the object.

11 Claims, 18 Drawing Figures

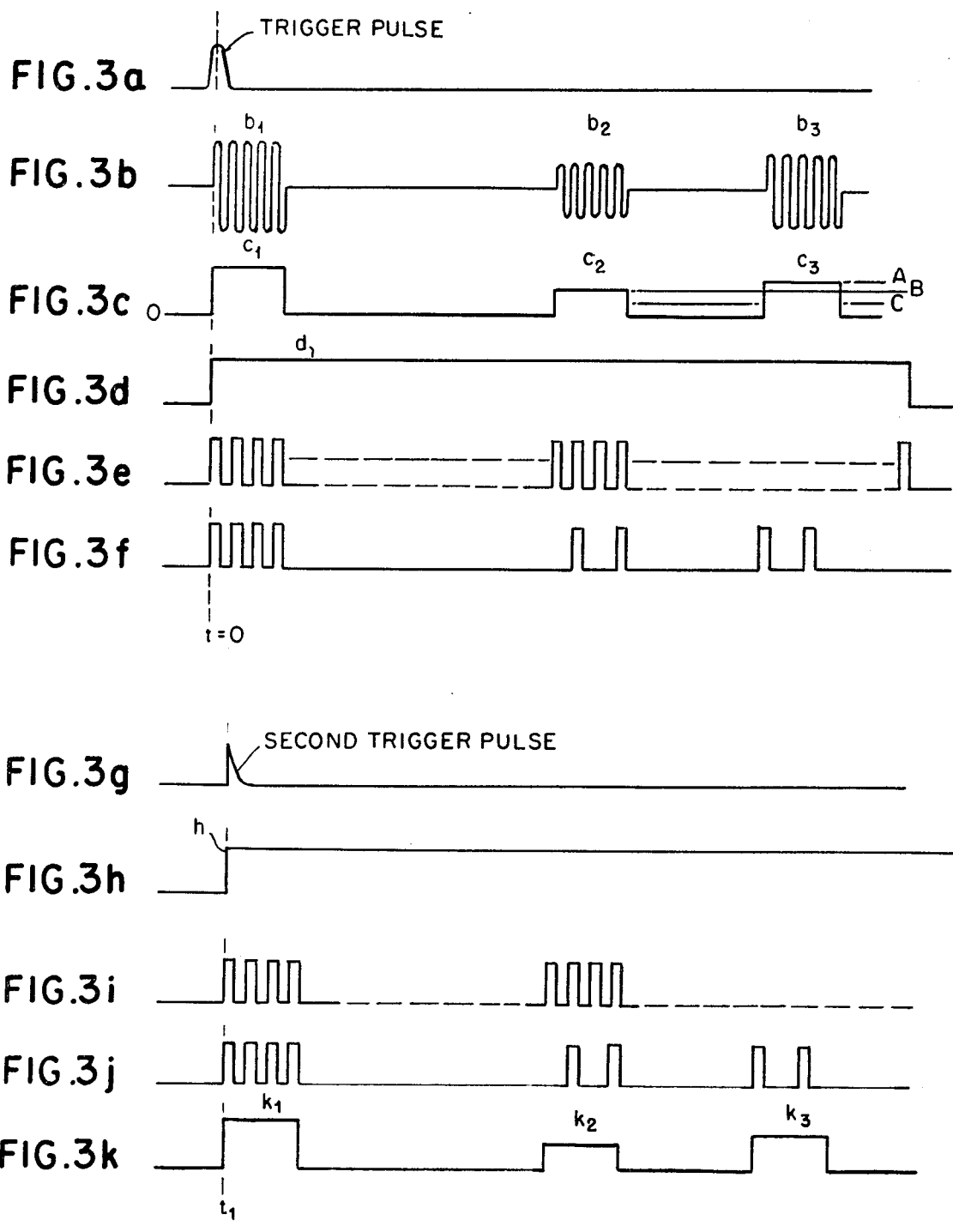

its longitudinal direction (the direction of arrow A). For this recording paper 4, a well-known wet paper employing the action of electrolysis or a well-known dry paper employing the action of electric discharge may be used. A first trigger device 5 for generating a trigger pulse is connected to the sender 3, sender 3 sending said electrical signal to the sound emitting and receiving means 1 in response to the trigger pulse. A stylus belt 7, which is arranged adjacent the recording paper 4 and which extends in the direction of the width of recording paper 4, is carried on an idler pulley $P_1$ and a drive pulley $P_2$, both of which are disposed near both side ends of said recording paper 4, respectively. Stylus belt 7 carries a contact member 9 and a stylus 10. Stylus belt 7 is driven in one direction (as shown by arrow B) by the drive pulley $P_2$ which is coupled to a drive means 8a, such as an electric motor, via a reduction gear 8. Trigger device 5 is mounted adjacent the belt 7 at the end thereof near the pulley $P_2$. Further provided is a second trigger device 6 which is mounted adjacent to the belt 7 at the end thereof near the pulley $P_1$. Trigger devices 5 and 6 preferably includes respective contacts which engage with the contacts 9 on the belt 7 to generate respective trigger pulses. When the contact 9 on belt 7 engages with the contact of trigger device 5, a trigger pulse is sent to sender 3 by the trigger device 5. When contact 9 engages with the contact of the second trigger device 6, a trigger pulse is sent to a mono-stable multivibrator 22 by the trigger device 6. The position of the stylus 10 on the stylus belt 7 is determined in such manner that the stylus 10 is located at the upper side end of said recording paper 4 (in FIG. 2) when the contact of trigger device 6 engages with the contact 9. An electric conductor plate 11 is further provided which is electrically connected to an amplifier 26 as will be described hereinafter. A slider 10', which is electrically connected to stylus 10, engages conductor plate 11.

A multivibrator circuit 12 is provided to control the start and stop of the write-in operation to a memory device 18, such as a shift register, which will be described hereinafter. A gate circuit 13 receives inputs from the multivibrator 12 and from a first clock pulse generator 14 for generating a clock pulse train to control the write-in operation to the memory device 18. The repetition frequency of the clock pulse from generator 14 is variable, whereby the measuring range of the device of the present invention can be selected freely.

An A-D converter 15 is provided for converting the analog signal received from the output of a detector circuit 16 into a digital signal. The detector 16 is connected to the output of amplifier 2 and generates an envelope signal corresponding to the output signal of the amplifier 2. In the illustrated embodiment, the amplitude of the analog signal from the detector circuit 16 is converted to a digital signal of either (00), (01), (10) and (11) by A-D converter 15. This will be described further hereinbelow. A gate circuit 17 couples the output A-D converter 15 to memory device 18.

In this embodiment, the memory device 18 comprises a shift register which may be formed of a plurality of multivibrator circuits. The memory capacity is determined by the product of given number of scanning spots and necessary number of bits for representing an analog signal as digital signal. In this embodiment, the number of scanning spots is selected to be 260 and the number of bits is 2, and therefore, there is used a shift register 18 having a memory capacity of 520 bits (=260 × 2). The digital signal from the A-D converter 15 is fed into shift register 18 via gate circuit 17 one after another, at the rate of one bit for every clock pulse from the first clock pulse generator 14.

The output terminal of shift register 18 is connected to the input of a D-A converter 25 and also to the reset terminal of the multivibrator 12. A monostable multivibrator 22 is provided for controlling the start and stop of readout operation of stored contents in the memory device 18. A second clock pulse generator 24 is provided for controlling the readout operation from shift register 18 and the repetition frequency of the second clock pulses is fixed. Generator 24 and multivibrator 22 are coupled to the input 19 of shift register 18 via a gate circuit 23. For each clock pulse from the second clock pulse generator 24 to the input terminal 19, one bit of stored information is read out to the output terminal 21 of shift register 18. The D-A converter 25 converts the digital signal from the shift register 18 to an analog signal, which is then amplified by amplifier 26. An inhibit circuit 27 may be provided, the function of which will be described hereinbelow.

The operation of the illustrated embodiment of this invention will now be described. The stylus belt 7 is driven by the driving power from the drive means 8a via the reduction gear 8 and the drive pulley $P_2$ in a direction of arrow B. A trigger pulse is applied to the sender 3 when the contact 9 engages with the contact of the first trigger device 5 at time $t_o$. This trigger pulse is shown in FIG. 3a.

The sender 3 is energized by this trigger pulse and sends an electrical signal having a waveform shown by signal $b_1$ in FIG. 3b to the sound emitting and receiving means 1 and to the amplifier 2. The sound emitting and receiving means 1 converts the signal $b_1$ into a sound signal and emits said sound signal. The emitted sound signal is reflected from objects such as a fish shoal, a sea bed, and the like. The reflected sounds are received, with a time delay, at the sound emitting and receiving means 1 and converted into electrical signals thereat. The electrical signals are amplified by the amplifier 2 and are then applied to the detector 16.

The reflection from a fish shoal is smaller in amplitude than that from a sea bed. Therefore, the electrical signal $b_2$ in FIG. 3b (corresponding to the reflection from a fish shoal) is smaller in amplitude than the electrical signal $b_3$ in FIG. 3b (corresponding to the reflection from a sea bed).

The electrical signals $b_1$, $b_2$ and $b_3$ from the amplifier 2 are detected by the detector 16 which generates an envelope signal corresponding to each of the signals $b_1$, $b_2$ and $b_3$. These envelope signals are shown by signals $c_1$, $c_2$ and $c_3$, respectively in FIG. 3c. These envelope signals are converted into digital signals of either (0 0), (0 1), (1 0) or (1 1) in accordance with their amplitudes (see FIG. 3f), by the A-D converter 15. As shown in FIG. 3f, the A-D converter 15 generates four pulses which correspond to the amplitude of signal $b_1$, two pulses which correspond to the amplitude of signal $b_2$ and two pulses which correspond to the amplitude of signal $b_3$. This will be described hereinafter, together with the detailed description of the A-D converter 15.

SOUNDING DEVICE FOR MEASURING A DISTANCE TO OBJECTS

This invention relates to apparatus for measuring and displaying a distance to objects by detecting the time between the transmission of a sound wave and reception of the reflection thereof by the object, and more particularly, to such an apparatus having a variable measuring range.

A fish finder is well-known as a typical form of such an apparatus. For simplification of the explanation, this invention will be described in detail in connection with a fish finder. The invention, however, is not restricted to a fish finder, and may be used in many other echo sounding, or sonar applications.

A well-known fish finder comprises a display means having a recording paper which moves with a constant velocity and a stylus which also moves with a constant velocity in a direction perpendicular to the direction of movement of the recording paper. The prior art fish finder also includes a sender for emitting a sound wave at a time when the stylus is at one side end of the recording paper, a receiver for receiving reflected sound waves from objects such as a fish shoals, a sea bed, or the like, and a means for applying electrical signal corresponding to the received reflected sound wave to the stylus to generate display marks having darkness corresponding to the amplitude of the electrical signal on the recording paper when the reflected sound wave is received at the receiver means. The distance between the fish finder device and the objects, such as a sea bed, a fish shoal, or the like, is represented by the distance between said one side end of the recording paper and said display marks on the recording paper.

Since the depth of sea varies at various points, the width of the recording paper is not always fully utilized in the above described prior art device, mainly due to the fact that the velocity of movement of the stylus is constant. For example, in sounding a shallow sea, even half of the width of the recording paper may not be necessary to display the sea bed depth on the recording paper, or, in the case of a deep sea, the sea bed may not be able to be displayed on the recording paper since the stylus would reach the other end of the paper before the full depth is indicated. It is desirable that a sea bed depth is always displayed near the lower side end of the recording paper.

One prior solution to this problem was to provide various fixed measuring ranges as, for example, 0–40m, 30–70m and 60–90m. Another prior solution was to vary the measuring range by controlling the sweeping velocity of the stylus by utilization of a two-speed motor. Still another solution was to use multiple styluses. The first prior solution has the fault that whole range of sea depths may not be capable of being simply displayed. The second prior solution has the fault that the number of possible measuring ranges is restricted and the third solution results in a device having a complicated structure.

An object of this invention is to provide a device such as a fish finder, echo sounder or the like, in which the measuring range is variable and in which the structure is simple.

Another object of this invention is to provide such a device in which the measuring range is variable even using a constant velocity stylus movement.

SUMMARY OF THE INVENTION

According to this invention, a device for measuring and displaying the distance to an object by employing sound, comprises means for emitting sound waves and for receiving a reflected sound wave from an object, means for generating a digital signal corresponding to the received reflected sound wave, a first clock-pulse generator having a variable repetition rate, a memory device having a predetermined memory capacity for storing the digital signal under the control of the clock pulses from the first clock pulse generator, a second clock pulse generator, having a fixed repetition rate, for generating clock pulse train to control the read out operation of the stored contents of the memory device, and display means for indicating the distance to an object in response to the output of the memory device.

In a preferred embodiment of this invention, the display means includes a recording paper which is driven with a constant velocity in its longitudinal direction and a stylus which is swept at a constant velocity traversely of the recording paper. The stylus marks the recording paper in accordance with the output digital signal from the memory device.

With the present invention, the width of the display means, such as a recording paper, cathode ray tube or the like, can be fully used in measuring various distances, merely by changing the repetition frequency of the first clock pulses to provide various measuring ranges.

Further objects and features of this invention will be understood from the following detailed description of preferred embodiment of the invention taken in conjunction with the accompanying drawings, in which:

FIGS. 3a–3k show the waveforms at various points of the embodiment illustrated in FIG. 2;

Figure 1A:
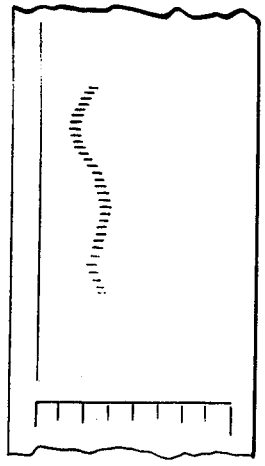
FIGS. 1a and 1b illustrate recording papers showing results obtained with a well-known type of fish finder.
Figure 1B:
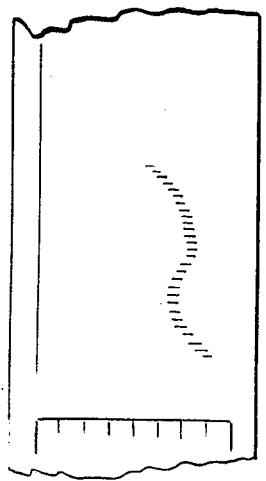

In the above described well-known type of fish finder having a stylus moving with a constant velocity, a recording paper is available for measuring and displaying a distance of 30 meters, as shown in FIG. 1a, but is not available for a distance of more than 30 meters.

On measuring and displaying a shallow sea, less than half of the width of the recording paper may be used for the display and the remaining portions may not be used. The present invention overcomes this fault of the prior art and enables full utilization of the recording paper.

Figure 2:
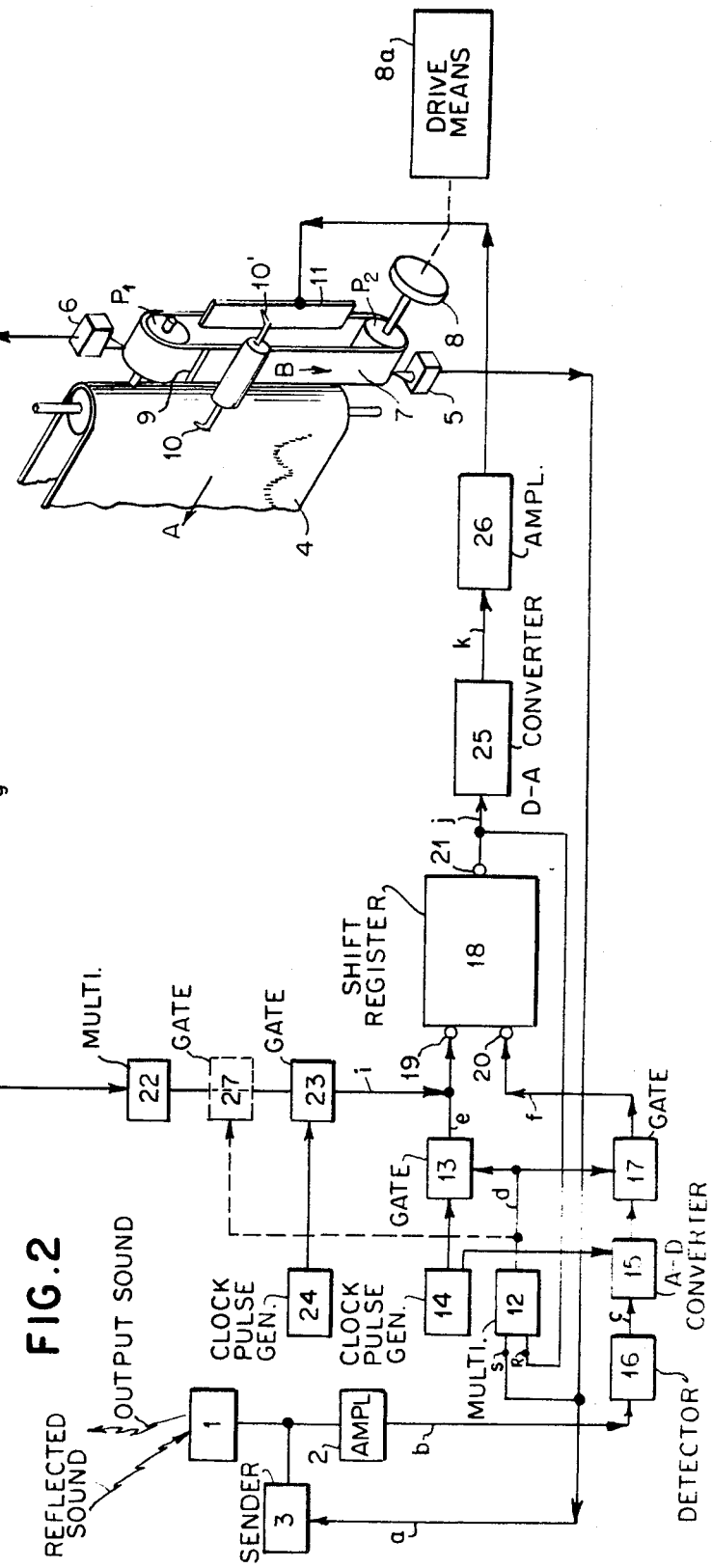
FIG. 2 shows a block diagram of an embodiment of this invention.

Referring now to FIG. 2, in which a block diagram of an embodiment of this invention is illustrated, a sound emitting and receiving means 1 for emitting sound waves and for receiving the reflected said sound waves from objects, is coupled to an amplifier 2 for amplifying the output signal from said sound emitting and receiving means 1. A sender 3 couples an electrical signal to said sound emitting and receiving means 1 which emits a sound wave corresponding to the electrical signal. A recording paper 4 is driven with a constant velocity in The trigger pulse from the first trigger device 5 is also applied to the multivibrator 12 at time $t_o$, to turn same on, and the output signal of multivibrator 12 is applied to gate circuits 13 and 17 to turn gate circuits 13 and 17 on. The output of multivibrator 12 is shown by signal d in FIG. 3d.

The clock pulses from the first clock pulse generator 14 are applied to the input terminal 19 of shift register 18 via the gate circuit 13, which was turned on by the output of multivibrator 12. At the same time, the digital signal from the A-D converter 15 is applied to the input terminal 20 of shift register 18 via the gate circuit 17, which was also turned on by multivibrator 12, and is written into the shift register 18 at the rate of one bit for every one clock pulse appearing at the input terminal 19. After the shift register 18 has been filled, the next clock pulse to the input terminal 19 pushes out one bit of the initially written-in information corresponding to the signal $b_1$ and one pulse, corresponding to the pushed out one bit, appears at the output terminal 21 of shift register 18. This pulse is applied to the reset terminal of multivibrator 12 to turn same off, thereby turning off the gate circuits 13 and 17. This completes the write-in operation to the shift register 18.

After the completion of the write-in operation to the shift register 18, when the contact 9 engages with the contact of the second trigger device 6 at time $t_1$, a second trigger pulse is applied to the monostable multivibrator 22 to actuate same to produce a square wave output signal as shown by signal h in FIG. 3h. The gate circuit 23 is turned on by the square wave signal h so that a clock pulse train from clock pulse generator 24 is fed to the input terminal 19 of shift register 18 via gate circuit 23. For each clock pulse applied to the input terminal 19 from clock pulse generator 24, one bit of the stored contents of shift register 18 are read out.

The clock pulse train from the second pulse generator 24 and the read-out signals from shift register 18 are shown in FIGS. 3i and 3j respectively. Since the repetition rate of the output of first pulse generator 14 is variable, the time base scale for FIGS. 3g–3k will generally not be the same as for FIGS. 3a–3f.

The read-out signal, which is a digital signal, is converted into an analog signal by the D-A converter 26 and, thereafter, is applied to the amplifier 26. The analog output signal from the D-A converter is shown in FIG. 3k. The output of the amplifier 26 is then applied to the stylus 10 through the conduction plate 11 and the slider 10' which contacts plate 11, so that respective mark lines corresponding to the analog signals $k_1$, $k_2$ and $k_3$ are displayed on the recording paper 4. During this read-out period, the belt 7 is driven in the direction of arrow B in FIG. 2.

Figures 4, 5A, 5B, 6:
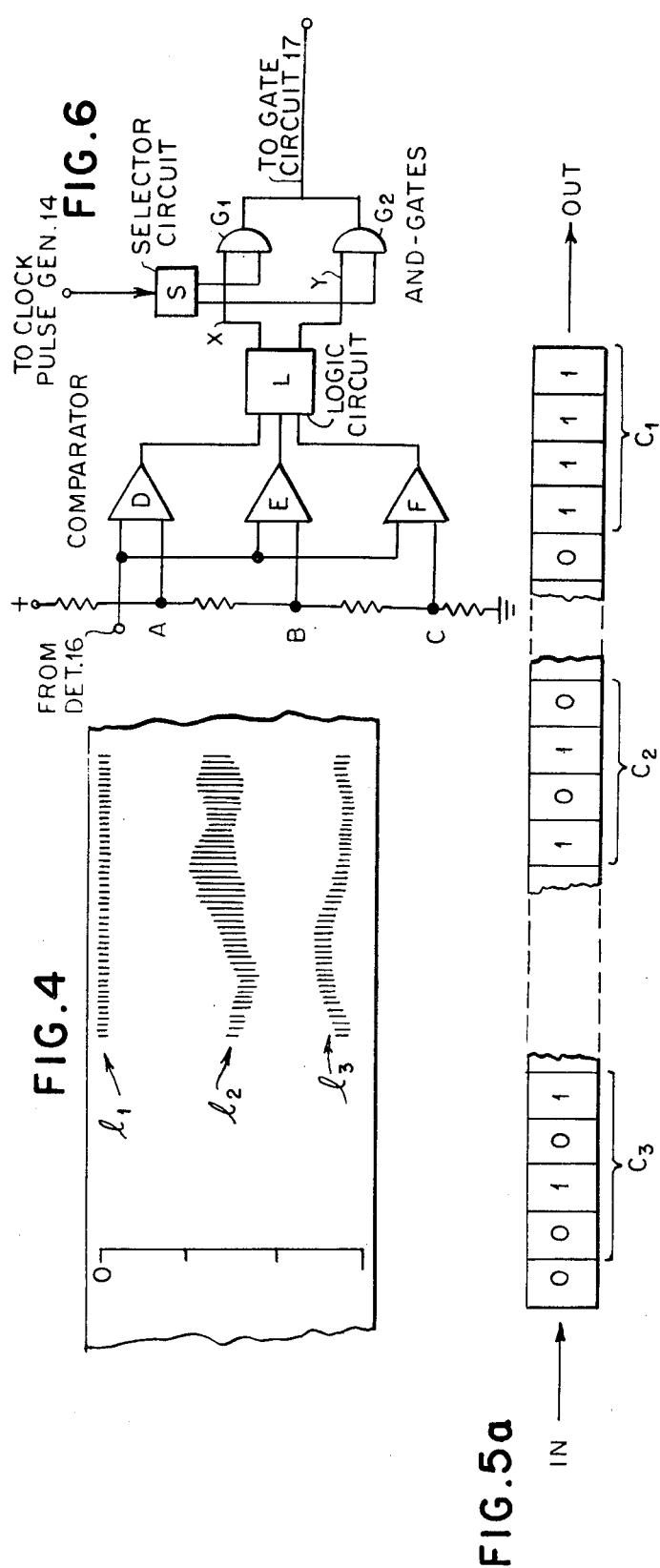
FIG. 4 illustrates an example of a recording paper on which data are displayed by the device of this invention.
FIGS. 5a and 5b show different shift registers used in the present invention.
FIG. 6 illustrates an example of the A-D convertor.

By successive operation in the same manner as above described successively measured data can be displayed at adjacent positions on the recording paper. Thus a plurality of measured data can be obtained on the recording paper 4 by the repetition of the above described operations, as illustrated in FIG. 4.

Therefore this apparatus may be used for displaying the state in the sea on a boat or a ship travelling on the sea.

The mark lines are generated on the recording paper 4 by the action of electrolysis or the action of electric discharge due to the spark from the stylus 10 by the electrical signal applied to the stylus 10. These systems correspondingly use recording paper of a wet type or a dry type, respectively.

The darkness of the mark lines displayed on the recording paper 4 corresponds to the amplitude of the electrical signal applied to the stylus 10.

The length of each of the mark lines displayed on the recording paper 4 is determined by the product of the width (or time duration) of the analog signal and the sweeping velocity of stylus, while the position of the mark lines on the recording paper 4 is determined by the product of the time between the initiation of a readout operation and the time of readout of the information of the signal corresponding to said mark line, and the sweeping velocity of the stylus. In FIG. 4, lines $l_1$, $l_2$ and $l_3$ respectively correspond to the signals $k_1$, $k_2$ and $k_3$ in FIG. 3k. In FIG. 4, the darkness of the mark lines is not correctly shown, for the simplification of the drawing. The time durations of the analog signals of FIG. 3k are dependent upon the repetition rate of the output of pulse generator 24, and, of course, varies in accordance with to the volume of the fish shoal. Usually the repetition rate of the pulses from generator 24 may vary in accordance with the width of the shoal in the direction of the depth of the sea.

In the above described embodiment, a shift register 18 having a memory capacity of 520 bits is used. In order that all information stored in this shift register 18 are indicated on the recording paper 4, all of the information of the 520 bits must be read out during the time when the stylus 10 moves from the upper side end to the lower side end of the recording paper 4. Therefore the pulse period of the clock pulses from the second clock pulse generator 24 is determined by the following equation:

$$\frac{\text{(Width of the recording paper)/(sweeping velocity of the stylus)}}{520 \text{ (bits)}}$$

Also, the gate circuit 23 must be maintained in its ON condition until all of the information is read out. Thus, the width of the square wave output from the monostable multivibrator 22 must be set to be a time determined by the width of the recording paper divided by the sweeping velocity of the stylus.

The write-in operation into the memory device 18 is performed at real time as is understood from above descriptions. The time period between the emission of a sound wave and the reception of the reflected sound wave from the sea bed is $2l/c$, where $l$ is the distance to the sea bed and $c$ is speed of sound in the sea. Therefore 520 pulses must be applied to the input terminal 19 of shift register 18 from the first clock pulse generator 14 during this time period $2l/c$, The repetition frequency of first clock pulses from the first clock pulse generator 14 must be set by the following equation:

$$\frac{520}{\frac{2l}{c}} = \frac{520C}{2l} = \frac{260C}{l}$$

$l$, the distance to the sea bed, is different at various places to be measured. Thus, the repetition frequency of the first clock pulses should be adjusted according to the places to be measured. This frequency variation provides a variable measuring range.

FIG. 5 is provided for explanation of the operation of the shift register 18 utilized above described embodiment. Analog signals $C_1$, $C_2$ and $C_3$ are stored as corresponding digital signals in corresponding blocks of the shift register 18 as illustrated in FIG. 5a, and 0's are stored in the remaining blocks. In the shift register illustrated in FIG. 5a, 520 bit storage positions are arranged in series. Alternatively two shift registers may be used in parallel for the memory device, each of which has memory capacity of 260 bits, a pair of contents of corresponding blocks of both shift registers representing one information unit. FIG. 5b, shows such a memory device formed with two shift registers, in which the same information as in FIG. 5a are stored as an example.

In utilization of either of the shift register configurations illustrated in FIGS. 5a and 5b, stored information can be read out from the output terminal (out) thereof at the rate of one bit for every one pulse fed to the input terminal (IN) thereof.

In the above described embodiment the memory capacity of the shift register 18 (i.e., the memory device) is selected to be 520 bits. However, it should be clear that other memory capacities may be selected, depending upon the particular use.

Between the engagement of the contacts 5 and 9 and the engagement of the contacts 6 and 9, the stylus 10 is driven from the lower portion to the upper portion of the recording paper 4. During this period, writing of the information into the memory device (or shift register) 18 is performed. There are, however, some cases where the contact 9 will engage with the contact 6 before the completion of the writing operation because the depth of the sea is great. In order to prevent the start of the readout operation in such cases, inhibit gate 27 (FIG. 2) is inserted between the monostable multivibrator 22 and the gate circuit 23. Inhibit gate 27 is turned on when multivibrator 22 is reset and is turned off when multivibrator 22 is turned on. Thus, the readout operation cannot be started until the writing operation is completed. The use of inhibit gate 27 is desirable, but is not absolutely necessary to the operation of the apparatus.

In the above described embodiment, a D-A converter 25 is used, but this is not always necessary. Without the D-A converter 25, the readout digital signals are applied to the stylus 10 and points, rather than lines corresponding to the signals are displayed on the recording paper 4.

Referring to FIG. 6, in which an A-D convertor 15 is shown, three comparators D, E and F are connected in parallel to the output of the detector circuit 16, and have reference voltages A, B and C, respectively applied to their other inputs. These reference voltages are determined as follows (see FIG. 3c);

$$A > B > C$$

When the voltage of the output from the detector circuit 16 is lower than C, none of the comparators D, E and F provide an output.

When the voltage of the output from the detector circuit 16 is lower than B but greater than C, an output signal is obtained from only the comparator F. When the output from the detector circuit 16 is lower than A but greater than B, output signals are obtained from two comparators E and F. When the output from detector circuit 16 is greater than A, output signals are obtained from all three comparators D, E and F.

Each output of three comparators D, E and F are coupled to the logic circuit L, which has two output terminals X and Y.

In the case when an output signals is obtained is referred to be "1", and when no output signal is obtained is referred to be "0, " the truth table of the output signal from each comparator and of output terminals X and Y is set forth below in Table 1.

TABLE 1

| Output from the detector 16 | Output from the comparator | | | Output from the terminals | |
|---|---|---|---|---|---|
| | D | E | F | X | Y |
| Not lower than A | 1 | 1 | 1 | 1 | 1 |
| Lower than A but not lower than B | 0 | 1 | 1 | 1 | 0 |
| Lower than B but not lower than C | 0 | 0 | 1 | 0 | 1 |
| Lower than C | 0 | 0 | 0 | 0 | 0 |

The logic circuit L is formed to meet with above truth table, and, namely, the following logic equation;

$$X = DEF + \overline{D}EF$$

$$Y = DEF + \overline{DEF}$$

It is noted from this that an analog signal from the detection circuit 16 can be converted to a digital signal of two bits.

Two AND-gates $G_1$ and $G_2$ are connected to the terminals X and Y, respectively, and the output terminals of the two AND-gates are commonly connected to an input terminal of the gate circuit 17.

A selector circuit S is connected to the first clock pulse generator 14 and feeds the pulses from the generator 14 to AND-gates $G_1$ and $G_2$ alternately.

Therefore, signals corresponding to each bit are sent out to the gate circuit 17 one after another, which couples these signals to the memory device 18, for storage. This takes place even if the memory device is a series type shift register of FIG. 5a or a parallel type shift register of FIG. 5b.

When using the parallel type shift register of FIG. 5b, a selector circuit (not shown) must be provided after the gate circuit 17 for coupling the signals through the gate circuit 17 to two shift registers alternately. But it will be appreciated that terminals X and Y may be connected to two shift registers, respectively, through the gate circuit 17, without the provision of the selector circuit S, the AND-gates $G_1$ and $G_2$, and the further selector circuit after the gate circuit 17, so that the digital signals of two bits can be written into the parallel type shift registers of FIG. 5b. In this case, it will be easily appreciated that the gate circuit 17 may be formed with two gates, which should be connected to the two terminals X and Y, respectively.

The D-A convertor 25 is designed to convert the two-bit digital signals read-out from the memory device 18 into analog signals. When a series type shift register of FIG. 5a is used as a memory device, every two-bit signal continuously read-out must be converted into an analog signal corresponding thereto by the D-A convertor 25. Such a D-A convertor will be easily formed by those skilled in the art. Alternatively, when a parallel type shift register of FIG. 5b is used as a memory device, the D-A convertor 25 must be formed such that every two bits, signals simultaneously read-out can be converted into an analog signal corresponding thereto.

This invention has been explained in connection with a particular embodiment, but is not be restricted to described embodiment. Various modifications and alternations may be easily made within the scope of this invention as set forth in the claims.

I claim:

1. Apparatus for measuring and displaying the distance to an object comprising:
    means for emitting sound waves and for receiving a reflected sound wave from an object;
    means coupled to said emitting and receiving means for generating a train of digital signals corresponding to said emitted and received reflected sound waves;
    a first clock-pulse generator having a variable repetition rate;
    a memory device having a predetermined memory capacity for storing digital signals from said digital signal generating means under the control of the clock pulses generated by said first clock pulse generator, said digital signal generating means and said first clock pulse generator being coupled to said memory device such that the repetition frequency of said first clock pulse generator solely determines and controls the sequential rate at which the individual pulses of said train of said digital signals are stored in said memory device;
    a second clock pulse generator coupled to said memory device for generating clock pulses to control the read-out operation of the stored contents of said memory device; and
    display means coupled to said memory device for providing an output display of said distances which correspond to the digital information read out from said memory device.

2. Apparatus according to claim 1 wherein the repetition rate of said second clock pulse generator is fixed.

3. Apparatus according to claim 1 wherein said digital signals are representative of the amplitudes of said emitted and received reflected sound waves.

4. Apparatus according to claim 1 wherein said means for generating digital signals comprises:
    a detector coupled to the output of said emitting and receiving means for generating respective envelope signals having an amplitude which corresponds to said emitted and received reflected sound waves; and
    an analog-to-digital converter coupled to said detector for converting said envelope signals to respective digital signals.

5. Apparatus according to claim 1 wherein said emitting and receiving means comprises:
    a sender for generating electrical signals; and
    means for emitting sound waves responsive to said electrical signals generated by said sender.

6. Apparatus according to claim 5 wherein said display means includes means for generating a first signal for activating said sender to cause said emitting means to emit a sound wave; and gating means receiving said first signal for electrically coupling said first clock-pulse generator and said train of digital signals to said memory device, thereby synchronizing said display means with said train of digital signals.

7. Apparatus according to claim 1 wherein said memory device comprises a shift register having a predetermined number of storage positions.

8. Apparatus according to claim 1 comprising a digital-to-analog converter coupling said display means to said memory device.

9. Apparatus according to claim 1 wherein said display means comprises:
    a recording paper;
    means for moving said recording paper with a constant velocity in the longitudinal direction thereof;
    a stylus sweeping traversely of said recording paper with a constant velocity; and
    means for actuating said stylus in accordance with said digital signals from said memory device to mark said recording paper to thereby indicate distance to an object.

10. Apparatus according to claim 9 wherein said first pulse generator has a repetition rate such that all of said digital signals are stored in said memory device during the time required for said stylus to make one sweep of said recording paper.

11. Apparatus according to claim 1 comprising means for inhibiting application of said clock pulses generated by said second generator to said memory device until all of said digital signals have been stored in said memory device.

* * * * *